United States Patent [19]

Olyphant, Jr. et al.

[11] 3,742,084
[45] June 26, 1973

[54] CORONA-RESISTANT ELECTRICALLY INSULATING ORGANIC POLYMERIC COMPOSITIONS

[75] Inventors: Murray Olyphant, Jr., East Oakdale; Arno Don Bridenbecker, North St. Paul, both of Minn.

[73] Assignee: Minnesota Mining and Manufacturing Company, St. Paul, Minn.

[22] Filed: Mar. 4, 1971

[21] Appl. No.: 121,171

Related U.S. Application Data

[63] Continuation-in-part of Ser. No. 856,846, Sept. 10, 1969, abandoned.

[52] U.S. Cl............ 260/827, 117/128.4, 117/201, 117/232, 252/63.2, 252/63.7, 260/37 SB, 260/41 A, 260/41 R, 260/824 R, 260/830 R, 260/858, 260/897 R
[51] Int. Cl...... C08f 29/10, C08f 35/02, H01b 3/46
[58] Field of Search.................. 260/827; 252/63.2, 252/63.7; 117/232

[56] References Cited
UNITED STATES PATENTS
3,575,916  4/1971  Bockstie ............................ 260/827
3,170,890  2/1965  Boyd et al........................... 260/824

Primary Examiner—Murray Tillman
Assistant Examiner—Wilbert J. Briggs, Sr.
Attorney—Kinney, Alexander, Sell, Steldt & Delahunt

[57] ABSTRACT

Organic, polymeric, electrically insulating compositions having high corona resistance comprising a base organic electrically insulating material and, in an amount equaling 1–10 percent of the weight of the base material, a silicone resin. A typical silicone resin is a hydrolyzate type of branched silicone resin prepared by condensation of mixed methyl and phenyl chlorosilanes.

9 Claims, No Drawings

CORONA-RESISTANT ELECTRICALLY INSULATING ORGANIC POLYMERIC COMPOSITIONS

REFERENCE TO RELATED APPLICATION

This application is a continuation-in-part of a copending application, Ser. No. 856,846, filed Sept. 10, 1969, and now abandoned.

BACKGROUND OF THE INVENTION

The insulation on high-voltage electrical equipment must be designed to resist the corona attack that high voltage can cause. Mica, which has superior corona resistance, is commonly employed in insulating high-voltage equipment, but a weak point in the insulation may occur in organic compositions used to complete the insulation. For example, corona attack may occur in organic compositions used to impregnate layers of mica tape, or in resin-impregnated tapes applied as an exterior wrap over micaceous insulation to prevent moisture-absorption by the mica. Special procedures are used to attempt to minimize such an attack. For example, the organic insulating compositions may be applied in excessive thicknesses in an attempt to prevent corona ionization in internal voids or in spaces adjacent conductors; or the insulating compositions may be applied by carefully controlled methods to attempt to prevent formation of the described internal voids or spaces; or the insulating compositions may be applied by carefully controlled methods to attempt to prevent formation of the described internal voids or spaces adjacent to conductors; or insulating liquids may be used to fill spaces within or between layers of the applied insulation. And yet, despite the use of these special, expensive procedures, the insulation does not always provide reliable and long-lasting protection against high-voltage corona attack.

SUMMARY OF THE INVENTION

The present invention provides organic polymeric electrically insulating compositions that resist failure under corona stress for much longer—often 20–50 times longer—than conventional organic polymeric electrically insulating compositions. These new compositions comprise (1) a base organic electrically insulating material that includes a polyolefin, an epoxy resin, a polyurethane, or an ethylene-propylene elastomer, and (2) in an amount equaling 1–10 percent of the weight of the base material, a silicone resin that (a) is substantially compatible with the base material, (b) is substantially not reactive with the base material under processing conditions for the composition, (c) has on the average at least 5 silicon atoms in each resin molecule, (d) has on the average at least 0.1 branch for each silicon atom in the resin molecule, and (e) has the formula $R_n Si X_m O_{4-n-m}/2$, where R is a monovalent hydrocarbon radical, X is hydroxyl or an alkoxy radical, the sum of $n$ and $m$ is less than 3, and $m$ is less than 1.

It is recognized that various silicone materials have been added to resin compositions in the past, generally to change surface properties, to increase adhesion, to improve water- or chemical-resistance or to widen the range of temperatures for using the resulting products; see, for example, Rochow, U.S. Pats. No. 2,258,218-22. Further, silicone fluids and silicone rubbers have been added to electrically insulating materials, in some cases to improve the corona resistance of those materials; for example, in Gore, U.S. Pat. No. 3,150,207, it was suggested to sinter poly (tetrafluoroethylene) on wire conductors in such a way as to trap globules of silicone oil within the insulation coating to increase corona-resistance; and in a report to an American Chemical Society meeting (J. R. Wolfe, Jr. and I. D. Roche, Contribution No. 138, 145th ACS meeting, New York, Sept. 8 – 13, 1963) it was disclosed that silicone oils and elastomers would improve the wet electrical properties of mineral-filled ethylene-propylene elastomers. It is also recognized that the good corona-resistance exhibited by silicone materials themselves is well known; see the Modern Plastics Encyclopedia Issue for 1962 (Vol 39, 1A, p. 279).

But insofar as is known, no one before this invention achieved the high improvement in corona resistance that is provided by this invention for the named electrically insulating organic materials. This improvement is all the more surprising since it is not generally obtained when silicone oils and elastomers, such as used in some of the above prior art, are attempted to be added to the named polymers. Silicone resins are distinguished from silicone oils or silicone elastomers in that the resins are more stably miscible or dispersible in the named materials during processing, apparently because of the branching of the resin molecule. It is believed that these silicone resins exhibit a slow migration to surfaces under corona attack. It is further believed that this tendency to migrate to surfaces and thereby increase in concentration at those surfaces contributes to the very large improvement in corona resistance that is obtained by the inclusion of such a surprisingly small amount of silicone resin. As will be discussed later, experiments have indicated that where the silicone resin reacts with constituents of the insulating composition to a degree that prevents migration of the silicone resin to a furface of the composition that is under corona attack, the corona resistance of the composition is substantially the same as it would be without the silicone resin.

Though silicone resins are generally more expensive than many common electrically insulating organic polymers, the low amount of silicone resin used in compositions of the present invention means that non-micaceous organic polymeric insulating compositions of excellent corona-resistance can be prepared in various forms at low cost and then incorporated in long-lasting insulation for electrical equipment subject to high-voltage corona attack.

DETAILED DESCRIPTION

As noted above, the base organic electrically insulating material in an insulating composition of the present invention includes one or more of a polyolefin, an epoxy resin, a polyurethane, or an ethylene-propylene elastomer. These materials are particularly useful for electrical insulation, and are useful for insulation that may be subjected to corona stress, for example, for electrical insulation on stator coils of high-voltage rotating machinery (where corona problems may occur at operating voltages of 2,000 volts and become particularly significant at 4,000 volts), for solid dielectric cables (where corona problems occur at voltages of 4,000 volts), and for other high-voltage apparatus such as transformers and switch-gear. These organic materials generally exhibit room-temperature direct-current electrical resistivities in excess of $10^{10}$ ohm-centimeters and dielectric strengths in 50-mil thicknesses of at least 250 volts/mil. The most useful compositions of the invention are generally based on epoxy resins. One useful kind of composition of the invention is a liquid impregnating resin composition, for impregnating into micaceous insulation, for example, comprising an epoxy resin, a silicone resin as described, and usually a filler such as talc. Outstanding improvements in corona resistance are obtained with compositions that include as base organic polymers an epoxy resin and a branched-chain acid-terminated polyester such as described in U.S. Pat. No. 3,027,279, especially when the silicone resin is included in an amount equal to 3–10 percent of the weight of the base organic polymer and especially when a filler is included in an amount equal to 15–150 percent of the weight of the base organic polymer. Such compositions are typically impregnated in tapes such as nonwoven webs of polyethylene terephthalate fibers.

As previously noted, the silicone materials added to the base organic electrically insulating material according to the present invention are generally classified as "resins" and may be distinguished from silicone fluids and silicone rubbers by the higher branching of their polymer molecule. A molecule of one of the useful silicone resins that includes 10 silicon atoms will likely have at least one branch, and may have two or more. Smaller resin molecules may or may not have branching, but upon dividing the number of branches in a whole sample of the useful resin by the number of silicon atoms in the sample, it will be found that on the average there is at least 0.1 branch for each silicon atom in the resin molecule, and preferably at least 0.2 branch for each silicon atom. This degree of branching provides the needed degree of compatibility between the silicone resin and base material, which is necessary to properly distribute the silicone resin molecules within the base material and obtain the desired slow diffusion to surfaces.

The polymer molecules of useful silicone resins have on the average at least 5, and preferably at least 10, silicon atoms to reduce any tendency for the resins to evaporate during processing or use. Because of the branched nature of the useful silicone resins, the ratio of hydrocarbon radicals to silicon atoms — $n$ in the formula above— will generally be less than 2; most often it will be between about 1.2 and 1.8. Also, the ratio of hydroxyl or alkoxy groups to silicon atoms — $m$ in the formula above— should be less than one; if the number of hydroxyl or alkoxy groups per silicon atom were greater than one, the reactivity of the silicone resin and base polymer would be too high. The further requirement for $n$ and $m$ in the formula above, that their sum be less than 3, follows from the fact that the resin is a siloxane polymer.

The hydrocarbon radicals attached to the siloxane backbone in the useful silicone resins generally are monovalent aliphatic radicals or phenyl radicals. Methyl radicals especially, but in addition ethyl and vinyl radicals, are the preferred aliphatic radicals since they do not sterically hinder or hide the main siloxy molecular beckbone to the extent that longer radicals would. Thus, the siloxane backbone, which is believed to absorb without damage a great deal of the energy of corona bombardment, is free to perform that function. Additionally, larger radicals are not desired since they reduce the migration of the silicone resins that is believed necessary and also reduce the thermal stability of the insulation product.

Experimental evidence indicates that reaction between the silicone resin and the base electrically insulating material of an insulating composition of the invention reduces and even eliminates any improvement in corona-resistance gained by inclusion of the silicone resin. For example, when one insulating composition consisting of a base material that included ten parts by weight of a diglycidyl ether of bisphenol A having an epoxide-equivalent weight of about 190 (Epon 828) and one part of diethylene triamine as curing agent for the epoxy resin, together with a silicone resin (Dow 840) in an amount equal to 7 percent of the weight of the base material was compared in tests for corona-resistance like those described in the following examples with an identical insulating composition that excluded the silicone resin, it was found that both compositions exhibited an almost identical corona resistance (1080 60-Hz-equivalent hours for the first composition and 1110 60-Hz-equivalent hours for the second composition). By contrast, when two similar insulating compositions consisting of a base material that included 96 parts by weight the same epoxy resin, 65.6 parts hexahydrophthalic anhydride as curing agent, and 0.5 parts tris (2,4,6-dimethylaminomethyl) phenol catalyst, with one composition including a silicone resin (Dow 840) in an amount equal to 5 percent of the weight of the base material and the other excluding silicone resin, were compared with each other, there was a great improvement in corona-resistance for the composition that included silicone resin (7800 60-Hz-equivalent hours for the composition with silicone resin as opposed to 1880 60Hz-equivalent hours for the one without silicone resin). It is believed that the difference in corona-resistance obtained by the amine-cured and the anhydride-cured compositions is caused by a reaction occurring between the silicone resin and the amine curing agent but not between the silicone resin and the anhydride curing agent.

Thus, the silicone resin should be substantially not reactive with the base organic electrically insulating material; it should not, for example, react into a crosslinked network of base organic polymers, nor should it react with other constituents that would prevent its migration to surfaces of the composition under corona attack. It has been observed that an oily substance appears on the surface of insulating compositions of the invention under corona attack, and this substance is believed to be the silicone resin. Ultimately a white powdery film forms on the surface. When an insulating composition of the invention fails in the corona test, cracks appear in the white powdery film, indicating, it is believed, exhaustion of useful amounts of the silicone resin.

To obtain the desired corona-resistance, the silicone resin should be included in an amount equal to at least one percent, and preferably at least three percent, of the weight of the base organic electrically insulating material. On the other hand, so as to obtain the benefit of the properties of the base material, including generally its lower cost, the silicone resin will be included in an amount less than an amount equal to about 10 percent of the weight of the base material. In addition, it has been found that electrical properties in the presence of moisture may be undesirably affected by inclusion of silicone resin in the insulating composition in an amount equal to much more than 10 percent of the weight of the base organic polymers.

The silicone resins can generally simply be mixed with the base material, and other ingredients in the electrically insulating composition, such as fillers or other additives in the composition. Certain fillers, such as talc, silica and mica flakes are desired in some compositions of the invention because those fillers further increase corona-resistance. The composition in liquid form--dissolved, undissolved, or hot-melt (meaning a continuous molten mass)—may be impregnated in a fabric; cast, calendered, or otherwise formed into or onto tape or sheeting, including micaceous tape or sheeting; or coated on wire conductors. In liquid form, the compositions are also useful for coating or encapsulating purposes. Thermoplastic and thermosetting compositions of the invention are useful for molding insulative housings.

The invention is further illustrated in the following examples.

EXAMPLES 1-6

A series of films comprising different base organic electrically insulating polymers were prepared and tested. For each polymer tested, there were both test films that included a modifying silicone resin and for comparison, other films that were not modified with a silicone resin. Hydrolyzate-type of branched silicone resins prepared by condensation of mixed methyl and phenyl chlorosilanes were used (resins of several different tradenames were used, specifically Dow Corning 840 (a 60-weight-percent-solids solution in toluene of a resin which analysis indicates is a siloxane polymer bearing diphenyl, dimethyl, monomethyl, and hydroxyl groups, with the number of phenyl and methyl groups being approximately equal and the number of monomethyl groups being about twice the number of dimethyl groups), Dow Corning 804, Dow Corning 805, and GE SR28). The parts by weight of silicone resin used in the test film per 100 parts of the base polymer is given in parentheses after identification of the modifying silicone resin; although the silicone resins come in solution form, the solvent was generally evaporated before the silicone resin was added to the composition, and the parts given do not include volatiles. The polyethylene samples were prepared by first milling the polyethylene at 250°F. for 10 minutes after which the silicone resin was slowly added to the mill, and the films were then formed by pressing the mixture at 350°F. for 10 minutes into 40 mil thicknesses. In the other cases the specimens were prepared in 5-15 mil thicknesses and then stacked to the thickness given.

The tests were performed with a test apparatus that included an upper electrode in the form of a plate of 18-mil-thick, ½-inch-square silicon core iron, and a lower electrode in the form of a much larger flat plate connected to ground through a high-voltage circuit-breaker. The film specimens, which were either self-supporting or coated on a support film, were placed between the two electrodes, and a probe connected to a high-voltage source was pressed against the upper electrode. Pre-dried surface was circulated through the test chambers for the tests conducted at room temperature; the higher temperature tests were carried out at the ambient humidity because of the difficulty of introducing predried air into the oven and because of the low humidity of room air at elevated temperatures. The tests were conducted with the voltage alternating at 1440 cycles per second, which accelerated the rate of corona aging by a factor of 24 over the 60-cycle corona stress that is experienced by insulation in power-frequency applications. Failure times in the following table are given in 60-Hz-equivalent hours, and were obtained by multiplying the measured time by 24. Five simultaneous tests were run on each test film, and the median failure time is reported in the table. The time of the unmodified specimen is given first in each pair of values and then the time for the modified specimen;

| Example | | Specimen-thickness (mils) | Voltage applied (kv.) | Voltage stress (volts/mil) (approximate) | Temp., °C. | Mean time to failure (60-Hz-equivalent hours) |
|---|---|---|---|---|---|---|
| 1 | Polyethylene:[1] | | | | | |
| | Unmodified | 40 | 3.0 | 75 | 80 | 1,615 |
| | Modified with DC 840; 5 parts | 40 | 3.0 | 75 | 80 | 72,100 |
| 2 | Polyurethane:[2] | | | | | |
| | Unmodified | 40 | 3.0 | 75 | 130 | 600 |
| | Modified with DC 840; 7 parts | 40 | 3.0 | 75 | 130 | 5,045 |
| 3 | Cured epoxy resin:[3] | | | | | |
| | Unmodified | 40 | 3.0 | 75 | RT | 1,880 |
| | Modified with DC 840; 5 parts | 40 | 3.0 | 75 | RT | 7,800 |
| 4 | Epoxy resin-based casting resin:[4] | | | | | |
| | Unmodified | 40 | 3.0 | 75 | RT | 3,740 |
| | Modified with DC 840; 5 parts | 40 | 3.0 | 75 | RT | 15,090 |
| 5 | Epoxy resin-based casting resin that includes 40 percent talc:[5] | | | | | |
| | Unmodified | 40 | 3.0 | 75 | RT | 5,260 |
| | Modified with DC 840; 5 parts | 40 | 3.0 | 75 | RT | 47,200 |
| | Modified with DC 840; 4 parts | 40 | 3.0 | 75 | RT | 18,410 |
| | Modified with DC 805; 5 parts | 40 | 3.0 | 75 | RT | 13,500 |
| | Modified with DC 840; 3 parts | 40 | 3.0 | 75 | RT | 9,930 |
| | Modified with DC 804; 5 parts | 40 | 3.0 | 75 | RT | 64,200 |
| 6 | Epoxy resin-polyester composition impregnated in nonwoven web:[6] | | | | | |
| | Unmodified | | | | 70 | RT | 1,750 |
| | Modified with DC 804; 5 parts | | | | 70 | RT | 49,800 |
| | Modified with DC 840; 5 parts | | | | 70 | RT | 88,900 |
| | Modified with GE SR28; 7 parts | | | | 70 | RT | 10,900 |
| | Modified as follows: | | | | | | |
| | DC 840:Talc (parts): | | | | | | |
| | 0:0 | 42-44 | 3.0 | 70 | 130 | 768 |
| | 0:0 | 42-44 | 3.0 | 70 | 130 | 1,055 |
| | 0:40 | 42-44 | 3.0 | 70 | 130 | 15,620 |
| | 4.2:30 | 42-44 | 3.0 | 70 | 130 | 29,630 |
| | 5:20 | 42-44 | 3.0 | 70 | 130 | 24,050 |
| | 5:40 | 42-44 | 3.0 | 70 | 130 | 37,150 |
| | 7:15.9 | 42-44 | 3.0 | 70 | 130 | 37,550 |
| | 7:30 | 42-44 | 3.0 | 70 | 130 | 46,550 |
| | 7:30 | 42-44 | 3.0 | 70 | 130 | 49,600 |
| | 7:30 | 42-44 | 3.0 | 70 | 130 | 54,100 |
| | 7:30 | 42-44 | 3.0 | 70 | 130 | 61,200 |
| | 7:44.1 | 42-44 | 3.0 | 70 | 130 | 39,650 |
| | 9:20 | 42-44 | 3.0 | 70 | 130 | 24,650 |
| | 9:40 | 42-44 | 3.0 | 70 | 130 | 59,900 |
| | 9.8:30 | 42-44 | 3.0 | 70 | 130 | 52,550 |

[1] Low-density polyethylene (0.918 density).
[2] Polyurethane resin comprising the reaction product of 8 parts castor oil and 5 parts of a prepolymer formed from toluene diisocyanate, polypropylene glycol, and a polyether triol in a 62:31:6 ratio.
[3] 96.5 parts of diglycidyl ether of bisphenol A having an epoxide equivalent weight of about 190 (Epon 828) cured with 65.5 parts of hexahydrophthalic anhydride.
[4] A liquid casting resin formed from a liquid diglycidyl ether of bisphenol A, a liquid carboxylic acid anhydride curing agent, and a carboxyl-terminated polyether glycol-maleic anhydride adduct flexibilizing agent.
[5] A liquid casting resin formed from the ingredients of the casting resin of Example 6 plus 40 weight-percent talc.
[6] A branched-chain acid-terminated polyester was prepared from 2,090 parts propylene glycol, 2,773 parts adipic acid, 2,277 parts isophthalic acid, and 277 parts trimethylol propane by the procedure of U.S. Pat. 3,027,279. The resulting acid-terminated polyester, which had an acid number of 28, was prereacted with 2,400 parts of a diglycidyl ether of bisphenol A having an epoxide-equivalent weight of 280-350 (Epon 836). A coating resin solution was then prepared from 2,560 parts of an 80-weight-percent-solids solution in toluene of the above reaction product; 183.3 parts of 50-weight-percent-solids solution in toluene of Epon 836; 687 parts of a mixture consisting of 6 weight-percent fine-particle size silica, 16 weight-percent red iron oxide pigment, 48 weight-percent of the above reaction product, and 30 weight-percent toluene; 495 parts toluene; 585 parts naphtha; and 3 parts stannic chloride pentahydrate. Unmodified test specimens were prepared by coating a 5-mil-thick nonwoven web of polyethylene terephthalate fibers with the above coating resin solution using a knife-coater set at a gap of 10 mils. Two coats were applied, each air-dried 2 hours; the product was finished by oven-drying for 1 hour at 200° C. The resultant product was 7-8 mils thick, test specimens consisted of test packets of the above product stacked to the necessary thickness. The modified test specimens were prepared by introducing the stated amount of silicone resin into the coating resin solution.

EXAMPLE 7

Two batches of a cable insulation compound were prepared from the following ingredients:

| | Parts by Weight |
|---|---|
| Ethylene-propylene copolymer including 55 weight-percent ethylene and having a Mooney viscosity between 35 and 45 and a specific gravity of 0.86 (Vistalon 404 supplied by Enjay) | 700 |
| Clay | 770 |
| Carbon black | 70 |
| Zinc oxide | 35 |
| Lead dioxide | 35 |
| Polymerized trimethyl dihydroquinoline | 7 |
| Dicumyl peroxide | 18.9 |
| Sulfur | 2.25 |

In addition, the second batch included 35 parts by weight of the silicone resin Dow Corning 840 described above. In both batches, all the ingredients except the curatives dicumyl peroxide and sulfur were blended with a spatula and then masticated in a banbury mixer in such a way that the temperature of the ingredients rose to 340°F. over a ten-minute cycle. The ingredients with the curatives added were then worked on a rubber mill heated to 200°F. for 5 minutes until throughly blended. Test films were then prepared by pressing the blended ingredients to an 18-mil thickness and curing them under pressure for 20 minutes at 370°F.

Five 1½-inch-square specimens of the modified compound and a sixth sample of the unmodified compound were placed on a common flat-surfaced brass electrode in a circulating air oven heated to 80°C. Alternating voltage at 1,200 Hz was fed to each sample individually through top electrodes consisting of ½-inch-square pieces of core iron; the stress level was 187 volts per mil. The time to corona failure was then measured and the expected chronological time to corona failure for the samples when subjected to alternating voltage at 60 Hz was determined by multiplying by 20 the actual measured time to failure.

The control sample failed after 2,095 60-Hz-equivalent hours while the median of the five modified samples failed after 38,090 60-Hz-equivalent hours. The resistance of the samples to ultraviolet light, ozone, brittleness under cold conditions, and stress-cracking in an aqueous solution including a wetting agent (Carbapol 630) were tested and found to be the same in the modified sample as in the unmodified sample. The dissipation factor and dielectric constant at low stress voltages, as well as the properties after heat aging for 2 weeks at 130°C., were slightly improved in the modified samples.

What is claimed is:

1. A room-temperature-solid composition of matter comprising (1) a continuous phase of a base organic insulating material that includes a polyolefin, and (2) mixed into the base organic insulating material in an amount equaling about 1-10 percent of the weight of the base organic insulating material, a silicone resin that (a) is substantially compatible with the base material, (b) is substantially not reactive with the base material under processing conditions used for the composition, (c) has on the average at least 5 silicon atoms in each resin molecule, (d) has on the average at least 0.1 branch for each silicon atom in the resin molecule, and (e) has the formula $$R_n \, SiX_m \, O_{4-n-m}/2,$$

where R is a monovalent hydrocarbon radical, X is a hydroxyl or alkoxy radical, the sum of $n$ and $m$ is less than 3, and $m$ is less than 1.

2. A composition of claim 1 in which the monovalent hydrocarbon radical of the silicone resin is selected from methyl ethyl, vinyl, and phenyl groups.

3. A composition of claim 1 in which the silicone resin has on the average at least 0.2 branch for each silicon atom in the resin molecule.

4. A composition of claim 1 that includes said silicone resin in an amount equal to at least 3 weight-percent of the base polymer.

5. A composition of claim 1 that further includes a particulate inorganic filler.

6. A composition of claim 1 in which the silicone resin has on the average at least 10 silicon atoms in each resin molecule.

7. A method for increasing the corona resistance of a composition of matter that (1) is used to provide electrical insulation on conductors where the insulation is subject to conditions leading to corona attack and (2) is based on an organic electrically insulating material that includes a polyolefin, the method comprising mixing into a continuous phase of the base organic electrically insulating material of the composition in an amount equaling about 1-10 percent of the weight of the base organic electrically insulating material, a silicone resin that (a) is substantially compatible with the base material, (b) is substantially not reactive with the base material under processing conditions used for the composition, (c) has on the average at least 5 silicon atoms in each resin molecule, (d) has on the average at least 0.1 branch for each silicon atom in the resin molecule, and (e) has the formula $$R_n \, SiX_m \, O_{4-n-m}/2,$$

where R is a monovalent hydrocarbon radical, X is a hydroxyl or alkoxy radical, the sum of $n$ and $m$ is less than 3, and $m$ is less than 1.

8. An insulated electrical article comprising an electric conductor and electrical insulation around the conductor comprising (1) a continuous phase of a base organic insulating material that includes a polyolefin, and (2) mixed into the base organic insulating material in an amount equaling about 1-10 percent of the weight of the base organic insulating material, a silicone resin that (a) is substantially compatible with the base material, (b) is substantially not reactive with the base material under processing conditions used for the composition, (c) has on the average at least 5 silicon atoms in each resin molecule, (d) has on the average at least 0.1 branch for each silicon atom in the resin molecule, and (e) has the formula $$R_n \text{SiX}_m O_{4-n-m}/2,$$

where R is a monovalent hydrocarbon radical, X is a hydroxyl or alkoxy radical, the sum of $n$ and $m$ is less than 3, and $m$ is less than 1.

9. An electrical cable comprising an elongated conductor and electrical insulation around the conductor comprising (1) a continuous phase of a base organic insulating material that includes a polyolefin, and (2) mixed into the base organic insulating material in an amount equaling about 1–10 percent of the weight of the base organic insulating material, a silicone resin that (a) is substantially compatible with the base material, (b) is substantially not reactive with the base material under processing conditions used for the composition, (c) has on the average at least 5 silicon atoms in each resin molecule, (d) has on the average at least 0.1 branch for each silicon atom in the resin molecule, and (e) has the formula $$R_n \text{SiX}_m O_{4-n-m}/2,$$

where R is a monovalent hydrocarbon radical, X is a hydroxyl or alkoxy radical, the sum of $n$ and m is less than 3, and $m$ is less than 1.

* * * * *

UNITED STATES PATENT OFFICE
CERTIFICATE OF CORRECTION

Patent No. 3,742,084　　　　　　　　Dated June 26, 1973

Inventor(s) Olyphant, Jr., Murray and Bridenbecker, Arno Don

It is certified that error appears in the above-identified patent and that said Letters Patent are hereby corrected as shown below:

Col. 6, line 23, "surface" should be -- air --.

Signed and sealed this 24th day of September 1974.

(SEAL)
Attest:

McCOY M. GIBSON JR.　　　　　　　C. MARSHALL DANN
Attesting Officer　　　　　　　　Commissioner of Patents